Dec. 29, 1925.
L. J. MAILLOT
ILLUMINATED LICENSE PLATE
Filed March 26, 1923
1,567,070
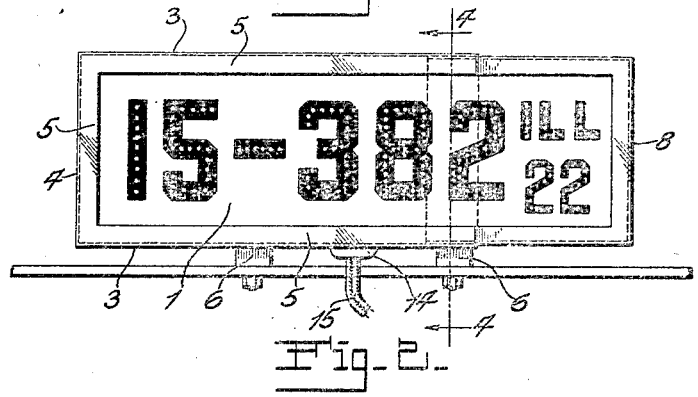
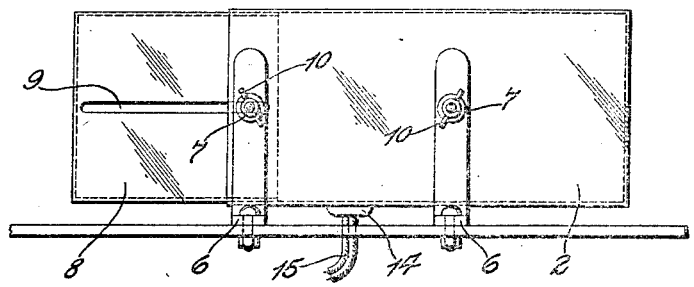
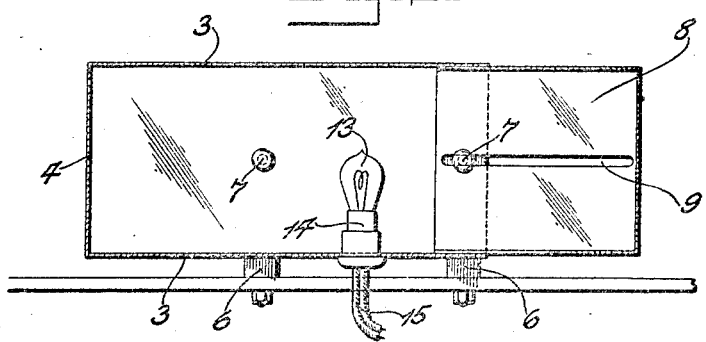
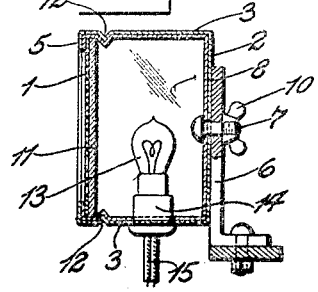
Inventor:
Louis J. Maillot,
His Attorneys.

Patented Dec. 29, 1925.

1,567,070

UNITED STATES PATENT OFFICE.

LOUIS J. MAILLOT, OF EAST ST. LOUIS, ILLINOIS.

ILLUMINATED LICENSE PLATE.

Application filed March 26, 1923. Serial No. 627,683.

*To all whom it may concern:*

Be it known that I, LOUIS J. MAILLOT, a citizen of the United States, residing at East St. Louis, St. Clair County, Illinois, have invented a new and useful Illuminated License Plate, of which the following is a specification.

This invention relates to an illuminated license plate.

An object of the invention is to provide a novel and improved illuminated license plate having an efficient means for illuminating the license number and other data thereon.

Another object of the invention is to provide improved means for supporting a license plate in position for illumination, and novel means for illuminating the outlines of the license numbers and other data on the plate.

Another object of the invention is to provide improved means for supporting license plates of different dimensions and for illuminating the same.

In the drawing, Fig. 1 is an elevation of the invention comprising a license plate having means for effectively illuminating the outlines of the license numbers, and means for supporting license plates of different dimensions.

Fig. 2 is a reverse side elevation.

Fig. 3 is a longitudinal sectional view.

Fig. 4 is a cross sectional view on the line 4—4 of Fig. 1.

The invention as shown comprises a license plate 1 having thereon a license number, designation of the State issuing the license, and a designation of the year for which the license is issued. The support for the license plate comprises a frame in which the plate is mounted and an enclosure for a lamp for illuminating the data on the plate. In the embodiment of the invention shown the support is an adjustable box-like structure or casing adapted to be adjusted to support license plates of different dimensions. Said casing or support comprises a back wall 2, top and bottom walls 3, a single end wall 4, and a flange 5 extending along the edges of the top, bottom and end walls to constitute a frame for retaining the license plate vertically between the top and bottom walls. Brackets 6 are secured to a supporting part of the vehicle and extend upwardly against the back wall 2 of the casing. Bolts 7 pass through the back wall 2 of the casing and through the brackets 6 and support the device rigidly in proper position.

A correspondingly constructed box-like portion 8 telescopes within that portion of the casing above described, the back wall of said portion 8 having a longitudinal slot 9 receiving one of the bolts 7 and permitting the part 8 to be adjusted in proper position corresponding to the length of the license plate mounted in the casing. The clamp nuts 10 are capable of being released and tightened so that it is necessary to loosen only one of the clamp nuts in order to permit adjustment.

The license plate is mounted in position in the adjustable frame described with an appropriately colored plate or section 11 of translucent material against its inner side. The top and bottom walls of the casing and the adjustable portion 8 thereof are provided with beads or indentations 12 which retain the license plate and the plate or section 11 in proper position, holding them in contact with the flanges 5. The plate 11 or the license plate is perforated in the outline of the characters on the license plate. In the embodiment shown the numbers, letters and characters on the license plate are perforated in the form of the characters so that the illumination from within the casing shows clearly in outline through the perforations and is thereby diffused to illuminate clearly all of the characters on the license plate. For instance, the license number "15–382" is formed in clear visible outline on the plate and is also formed thereon by the perforations, as will be readily understood by reference to Fig. 1. So, also, the designation of the State issuing the license is formed thereon in clear visible outline and, in addition, with perforations within the outline of the limits of said outline. This is also true of the indication of the year for which the license plate is issued.

The means for illuminating the license plate comprises an electric lamp 13 supported in a socket 14 within the casing and controlled by an electric circuit 15.

The license number, the designation of the State in which it is issued and the designation of the year for which it is issued, all are clearly visible during the day without illumination. During the night, or in the dark, all such indicia are rendered almost as clearly visible as during the day because of the perforations forming the characters within the borders of the outlined characters. This construction provides a more efficient illumination than does a construction in which the numbers are cut out, and there is maximum visibility at all times.

I am aware that the construction and arrangement may be varied without departure from the nature and principle of the invention which obtains all of its objects and purposes in an efficient and highly economical manner. I do not restrict myself unessentially, but what I claim and desire to secure by Letters Patent is:—

In a device of the character described a casing member comprising of each a top, a bottom, a back and an end wall; downwardly and upwardly extending flanges from the edges of the top and bottom walls respectively; longitudinal parallel beads in said top and bottom walls equidistant from and parallel with said flanges; a second casing member telescoped within the first one and comprising of each a top, a bottom, a back and an end wall, and having an elongated slot in said back wall; downwardly and upwardly extending flanges from the edges of the top and bottom walls respectively of said second casing member; longitudinal parallel beads in said top and bottom walls of said second casing member equidistant from and parallel with said second named flanges and receiving said first named beads; a fastener passing through said slot and through the back wall of said first casing member for holding said casing members in different relative positions; and a license plate in said casing members between said beads and said flanges.

LOUIS J. MAILLOT